US005614575A

United States Patent [19]
Kotschwar

[11] Patent Number: 5,614,575
[45] Date of Patent: Mar. 25, 1997

[54] SPRAYABLE POLYURETHANE COMPOSITIONS

[75] Inventor: Rex R. Kotschwar, Omaha, Nebr.

[73] Assignee: RPG. Inc., Carroll, Iowa

[21] Appl. No.: 427,452

[22] Filed: Apr. 24, 1995

[51] Int. Cl.$^6$ .............. C08K 5/01; C08K 5/02; C08K 5/10; C08G 18/50
[52] U.S. Cl. .............. 524/270; 524/462; 524/464; 524/590; 524/764; 524/792; 524/874; 524/875; 525/123; 525/127; 525/130; 525/131; 528/48; 528/49; 528/60; 528/77; 528/78; 528/80
[58] Field of Search .............. 528/49, 60, 77, 528/78, 80, 48; 524/270, 462, 464, 590, 764, 792, 874, 875; 525/123, 127, 130, 131

[56] References Cited

U.S. PATENT DOCUMENTS

| | | | |
|---|---|---|---|
| 3,391,101 | 7/1968 | Kelly et al. | 528/77 |
| 3,442,888 | 5/1969 | Degginger et al. | 528/77 |
| 3,640,997 | 2/1972 | Fijal | 528/78 |
| 4,218,543 | 8/1980 | Weber et al. | 521/51 |
| 4,296,230 | 10/1981 | Pedain et al. | 528/67 |
| 4,677,157 | 6/1987 | Jacobs | 524/789 |
| 4,808,636 | 2/1989 | Saito et al. | 528/77 |
| 5,151,483 | 9/1992 | Harasin et al. | 528/44 |
| 5,204,439 | 4/1993 | Dormish et al. | 528/44 |
| 5,233,009 | 8/1993 | Madan et al. | 528/60 |

OTHER PUBLICATIONS

ARCO Chemical, "THANOL® R–420", ARCO Chemical Thanol Polyol Product Data, six pages.
Albemarle Corporation, "ETHACURE 300 Curative", 8 pages, Jun. 7, 1994.
Ethyl Corporation –Chemicals Group Material Safety Data Sheet, "Ethacure® 300 Curative", 8 pages, Feb. 20, 1989.
Ethyl Corporation –Chemicals Group Material Safety Data Sheet, "ETHACURE 100 Curing Agent; DETDA", 9 pages, Jan. 11, 1991.
MILES Product Information, "Mondur MR –Product Code: G172", one page, May 1993.
MILES Product Information, "Multranol 9181 –Product Code: K181", one page, Jul. 1992.
MILES Product Information, "Multranol 9157 –Product Code: K157", one page, Oct. 1992.
MILES Product Information, "Multranol 9121 –Product Code: K121", one page, Mar. 1992.
Mobay Corporation Product Information, "DESMOPHEN 651A–65 –Saturated Polyester (Product Code DA–23)", 2 pages, Nov. 1990.
Mobay Corporation Product Information, "DESMOPHEN 800 –Saturated Polyester (Product Code D–501)", 2 pages, Jun. 1990.
Mobay Corporation Product Information, "DESMOPHEN 670A –Saturated Polyester (Product Code DA–108)", 2 pages, Oct. 1990.
Mobay Corporation Product Data sheet, "DESMOPHEN 670A–80 –Saturated Polyester (Product Code D–518)", 2 pages, Sep. 1987.
Mobay Corporation Product Data sheet, "MULTRON R–12A –Saturated Polyester (Product Code D–013)", 2 pages, Jun. 1990.
Mobay Corporation Product Data sheet, "MULTRON R–18 –Saturated Polyester (Product Code D–018)", 2 pages, Nov. 1986.
Mobay Corporation Product Data Sheet, "DESMOPHEN 1652 –Saturated Polyester (Product Code D–515)", 2 pages, Nov. 1986.
Mobay Corporation Product Data Sheet, "DESMOPHEN 1700 –Saturated Polyester (Product Code D–016)", 2 pages, Nov. 1986.
Mobay Corporation Product Data Sheet, "DESMOPHEN 1155 –Polyesterether Polyol (Product Code D–498)", 3 pages.
Mobay Corporation Product Data Sheet, "DESMOPHEN 1150 –Polyesterether Polyol (Product Code D–502)", 10 pages.
Mobay Corporation Product Data Sheet, "DESMOPHEN 650A–65 –Saturated Polyester (Product Code D–075)", 2 pages, Nov. 1986.
Mobay Corporation Product Data Sheet, "MULTRON R–221–75 –Saturated Polyester (Product Code D–025)", 2 pages, Nov. 1986.
Mobay Corporation Product Data Sheet, "DESMOPHEN 1100 –Saturated Polyester (Product Code D–503)," 2 pages, Nov. 1986.
Mobay Corporation Product Data Sheet, "DESMOPHEN 1140 –Polyesterether Polyol (Product Code D–505)," 2 pages, Jan. 1988.
Mobay Corporation Product Data Sheet "DESMOPHEN 1300–75 –Saturated Polyester (Product Code D–504)", 2 pages, Nov. 1986.
Mobay Corporation Product Data Sheet, "DESMOPHEN 1145 –Polyesterether Polyol (Product Code D–497)", 4 pages, Nov. 1988.
Mobay Corporation, *MILES* Material Safety Data Sheet, "Multranol 6501", pp. 1–6, Sep. 13, 1991.
J.H. Saunders et al., "Polyurethanes", *Chemistry and Technology*, Part I. Chemistry, cover page and p. 40.
Ulrich et al., "Urethan Polymers", *EREA*, pp. 1209–1212, 1984.

Primary Examiner—James J. Seidleck
Assistant Examiner—Rabon Sergent
Attorney, Agent, or Firm—Mueting Raasch Gebhardt & Schwappach, P.A.

[57] ABSTRACT

A sprayable polyurethane composition containing an isocyanate component and a polyol component is provided, wherein the polyol component includes a polyether polyol amine; a nitrogen-free hydoxy-terminated polyether; and a sucrose-polyether polyol. Preferably, these two components are combined while spraying them individually into a mold along with a fibrous-reinforcing material.

7 Claims, No Drawings

SPRAYABLE POLYURETHANE COMPOSITIONS

FIELD OF INVENTION

The present invention relates to sprayable polyurethane compositions and a process for the preparation of polyurethanes, particularly fiber-reinforced polyurethanes, using a spraying technique.

BACKGROUND OF THE INVENTION

The fiber-reinforced plastics industry, particularly the glass-reinforced polyester industry, is under pressure from environmental and safety regulators to reduce and eventually eliminate the use and production of volatile organic compounds. As a result, these industries are searching for methods that avoid the use of organic solvents, particularly in spraying applications. For example, the glass-reinforced polyester industry, which uses styrene in the manufacturing process, has begun to use styrene-suppressed resins. It is particularly desirable to avoid the use of styrene because it is highly tamable as well as a suspected carcinogen and environmental contaminant. These styrene-suppressed resins, however, include a significant amount of wax, which calls for special precautions, such as careful surface preparation to remove wax, to ensure good secondary bonds. Thus, alternative resin systems are needed for the preparation of fiber-reinforced plastic components.

Solvent-free and low-solvent two-component polyurethane systems are known and used in the production of coatings, resins, lacquers, pastes, and adhesives. For example, two-component lacquers based on 4,4'-diisocyanato diphenylmethane are used in quick-hardening coatings on concrete, steel, industrial floors, etc. Two-component polyurethane systems are also used in making molded parts. For example, in the reaction injection molding (RIM) process, a polyisocyanate and an isocyanate-reactive component, e.g., a mixture of a polyol and a chain extender or crosslinker having amine or hydroxyl groups, are mixed and injected, generally under high pressure, into a mold with subsequent rapid curing. These "two components," i.e., the isocyanate component and the isocyanate-reactive component, are highly reactive and therefore must be introduced into the mold very rapidly and perfectly mixed. Fiber-reinforced molded products can be made using the RIM process with a reinforcing mat placed in the mold. Generally inferior products result, however, because the RIM reactants react too quickly and become too viscous before they are able to completely impregnate the mat.

A more desirable process than reaction injection molding involves spraying. Few polyurethane compositions are available that can be sprayed, however, particularly to form fiber-reinforced molded products. This is because curing of polyurethane compositions are difficult to control such that fibrous reinforcement material, e.g., fiberglass, can be fully impregnated or wetted out.

Thus, a need exists for a method for the production of polyurethanes, particularly fiber-reinforced polyurethanes, that can be readily controlled, particularly with respect to the cure time and viscosity. Also, a need exists for a method for the production of polyurethanes that is substantially free of volatile organic compounds.

SUMMARY OF THE INVENTION

The present invention provides a substantially volatile-free spraying technique for the production of polyurethanes, particularly polyurethanes with fiber reinforcement. This method is economical, efficient, and can be used to produce a wide range of products, including structural building panels and large bodies for tank linings, pools, roofs, trucks, cars, boats, etc. The present invention also provides a polyurethane prepared from a composition comprising: an isocyanate component and a polyol component that includes a polyether polyol amine, a nitrogen-free hydoxy-terminated polyether, and a sucrose-polyether polyol. Preferably, the polyol component includes a hydroxy-free diamine curative. This composition can be reinforced with chopped fibers or a fibrous mat, for example.

Preferably, the method of the present invention uses a relatively low viscosity isocyanate component and a relatively low viscosity polyol component, which are combined substantially simultaneously and directed into a mold. That is, these two components are combined while spraying them individually into a mold, preferably along with a fibrous-reinforcing material. Specifically, continuous fiber rovings are fed to an air driven chopper unit attached to a spray gun, where they are cut into suitable lengths and conveyed to the mold surface by the stream of polyurethane resin from the spray gun.

DETAILED DESCRIPTION OF THE INVENTION

The present invention provides a polyurethane prepared from a sprayable composition and a spraying technique for preparing such polyurethanes. Advantageously, the polyurethanes, and the method of making them, are substantially free of organic solvents. The method is also advantageous because it produces little or no volatile organic compounds. The polyurethanes of the present invention are obtained by reacting an isocyanate component and a polyol component, preferably in the presence of a filler material such as chopped fibers or a fibrous mat. As with other "two-component" polyurethane systems, the isocyanate and polyol components can each consist of one material or a blend of materials. Preferably, the reaction between the isocyanate and the polyol components is enhanced by the presence of a hydroxy-free diamine curative. The compositions of the present invention are particularly suitable for making molded or shaped articles such as structural building panels, wind deflectors, cabinet covings, bumpers, etc.

Both the isocyanate component and the polyol component are of a relatively low viscosity such that they are capable of being sprayed, typically at an elevated temperature (e.g., 35°–65° C.). For example, the isocyanate component and the polyol component each have a viscosity at 38° C. of no more than about 2000 centipoise (cps), preferably no more than about 500 cps, and more preferably no more than about 200 cps. When the isocyanate and polyol components are combined, the viscosity of the reaction mixture will increase with time as it gels, however, the viscosity should be sufficiently low for an initial amount of time to wet out a filler material incorporated therein. Furthermore, the cure time should be sufficiently fast to avoid foaming, particularly when used in conditions of high humidity. Thus, the compositions of the present invention are particularly advantageous because they can be adjusted for open time to enhance "wet out" of the filler material, e.g., fiber reinforcement, and compensate for environmental conditions, e.g., humidity.

The compositions of the present invention are particularly advantageous because the speed of reaction between the isocyanate component and the polyol component can be controlled. That is, the open time, i.e., the time during the gelling phase in which the reaction mixture is flowable, can be varied over a wide range by varying the amounts and types of the components in the composition. By adjusting the rate of reaction to be relatively slow, for example, filler material can be wetted out effectively to produce a generally homogeneous composite.

The ratio of total isocyanate groups (—NCO) in the isocyanate component to the hyroxy groups (—OH) and other active hydrogen-containing compounds, such as amine groups, in the composition is referred to as the isocyanate index and expressed as a percentage of excess isocyanate. The isocyanate index compares the total number of isocyanate groups with the total number of hydroxy and amine groups in the reactant compounds. Preferably, the isocyanate index of the compositions of this invention is about 105–150, more preferably about 115–125, and most preferably about 118–122.

The isocyanate component can include diisocyanates, polyisocyanates, or mixtures thereof. The isocyanates suitable for use in the preferred embodiments of the present invention include aliphatic, alicyclic, arylaliphatic, aromatic, and heterocyclic polyisocyanates, or combinations thereof. Any isocyanate or mixture thereof that is suitable for use in the production of polyurethanes and is capable of being sprayed can be utilized in the method of the present invention. Such isocyanates include those having the formula $Q(NCO)_n$ in which n=2–5 (preferably n=2–3). Referring to this formula, Q is an aliphatic hydrocarbon group containing 2–18 (preferably 6–10) carbon atoms, an alicyclic hydrocarbon group containing 4–15 (preferably 5–10) carbon atoms, an arylaliphatic group containing 8–15 (preferably 8–13) carbon atoms, and an aromatic hydrocarbon group containing 6–15 (preferably 6–13 ) carbon atoms.

Examples of suitable isocyanates include ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3-diisocyanate, cyclohexane-1,4-diisocyanate, diisocyanate-3,3,5-trimethyl-5-isocyanatomethyl cyclohexane, 2,4-toluene diisocyanate, 2,6-toluene diisocyanate, diphenylmethane-2,4'-diisocyanate, diphenylmethane-4,4'-diisocyanate, naphthalene-1,5-diisocyanate, triphenylmethane-4,4',4"-triisocyanate, polymethylene polyphenylene polyisocyanates, m- and pisocyanatophenyl sulfonyl isocyanates, perchlorinated aryl polyisocyanates, norbornane diisocyanates, polyisocyanates containing carbodiimide groups, polyisocyanates containing allophanate groups, polyisocyanates containing isocyanurate groups, polyisocyanates containing urethane groups, polyisocyanates containing biuret groups, polyisocyanates produced by telomerization reactions, polyisocyanates containing ester groups, polyisocyanates containing polymeric fatty acid esters, reaction products of the above-mentioned diisocyanates with acetals, and mixtures thereof. Distillation residues (obtained in the commercial production of isocyanates) having isocyanate groups can also be used alone or in solution in one or more of the above-mentioned polyisocyanates. Other suitable isocyanates are described in U.S. Pat. No. 5,204,439 (Dormish et al.).

Particularly useful isocyanates are aromatic diisocyanates having a % NCO content of about 30–32%, such as toluene and diphenylmethane diisocyanates in pure, modified, or crude form. MDI variants (e.g., dipherylmethane diisocyanate modified by the introduction of urethane, allophanate, urea, biuret, carbodiimide, uretonimine, or isocyanurate residues) and the mixtures of diphenylmethane diisocyanates and oligomers thereof known in the art as crude or polymeric MDI (polymethylene polyphenylene polyisocyanates) are especially useful. A particularly useful isocyanate is a mixture of diphenylmethane-2,4'-diisocyanate and diphenylmethane-4,4'-diisocyanate available under the tradename MONDUR MR from Miles Inc., Pittsburgh, Pa. An alternative is available under the tradename RUBINATE M from Imperial Chemical Co.

The polyol component is a blend of a polyether polyol amine, a nitrogen-free hydroxy-terminated polyether, and a sucrose polyether polyol. These components can be used in various amounts within this blend depending upon the desired processing conditions and product characteristics. For example, for a harder product, a greater equivalent weight of the polyether polyol amine is used relative to that of the sucrose polyether polyol, and for a more flexible product, a greater equivalent weight of the sucrose polyether polyol is used relative to that of the polyether polyol amine.

The polyether polyol amines are hydroxy-terminated polyethers containing tertiary amine groups. These are the reaction products of amines or aminoalcohols with an alkylene oxide. These polyether polyol diamines preferably have OH numbers of about 250–1500, and more preferably about 400–790. They preferably have a molecular weight of about 150–700, and more preferably about 200–400. Suitable amines include aliphatic, alicyclic, arylaliphatic, aromatic, and heterocyclic monoamines, diamines, and triamines, as well as monoalkanolamines, dialkanolamines, and trialkanolamines. Examples of suitable amines for use in preparation of the polyether polyols cantaining tertiary amine groups include, but are not limited to, aniline, monoethanolamine, diethanolamine, triethanolamine, propanolamine, the various straight and branched chain isomers of diaminopropane, diaminobutane, diaminohexane, diaminoheptane, diaminooctane, diaminononane, diaminodecane, 1,2- and 1,3-diaminopropane, 1,3-, 2,3-, and 1,4-diaminobutane, 1,2-diamino-2-methylpropane, 1,5-diaminopentane, 1,4-diamino-1-methylbutane, 1,4-diamino-2-methylbutane, 1,3-diamino-1-ethylpropane, 1,3-diamino-1,1-dimethylpropane, 1,3-diamino-1,2-dimethylpropane, 1,3-diamino-2,2-dimethylpropane, 1,5-diamino-2-methylpentane, 1,6-diaminohexane, the various isomers of diaminocyclobutane, diaminocyclopentane, diaminocyclohexane, diaminocycloheptane, diaminocyclooctane, and diaminocyclononane. Also useful are the diamino-1-methylcyclohexanes, the methylenebis(cyclohexylamines), the diamino-1-methylcyclopentanes, the diaminodimethylcyclohexanes, and the like. These amines are reacted in a conventional manner with an alkylene oxide, such as ethylene oxide and/or propylene oxide, to form the polyether polyol amines.

The polyether polyol amines include 2–6 hydroxy groups per molecule, preferably 4 hydroxy groups per molecule. More preferably, the polyether polyol amines are tetrahydroxy-terminated ethylenediamine-alkylene oxide adducts, i.e., tetrahydroxy-terminated poly(oxyalkylene)ethylenediamines. One particularly suitable adduct is N,N-[bis poly(propylene oxide)]ethylenediamine, which is available under the tradename MULTRANOL 9181 from Miles Inc., Pittsburgh, Pa., QUADROL from BASF, or CL-485 from Air Products Co. The amount of the polyether polyol amine in the polyol component is preferably about 20–60 parts by weight per 100 parts by weight of the polyol component, more preferably about 30–50 parts by weight, and most preferably about 40–45 parts by weight.

As used herein, the "polyol component" includes the polyether polyol amine, the nitrogen-free hydoxy-terminated polyether, and the sucrose polyether polyol, as well as any other desired additives, as discussed below. Although, one of skill in the art will recognize that certain of the additives can be included in the isocyanate component if desired.

The nitrogen-free hydroxy-terminated polyethers are polyhydroxy or monohydroxy polyethers. These polyethers preferably have OH numbers of about 200–500, and more preferably about 240–270. They preferably have inolecular weights of about 300–800, and more preferably about 400–700, and are in the liquid state. The nitrogen-free hydroxy-terminated polyethers include, for example, diols for elongation and flexibility, and triols for tensile strength, which can be used individually or in combination. Preferably, the polyol component contains at least one type of triol. More preferably, the polyol component contains at least one type of triol and at least one type of diol.

Suitable nitrogen-free hydroxy-terminated polyethers include, but are not limited to, the alkoxylation products, e.g., propoxylation and/or ethoxylation products, of water or low molecular weight alcohols, such as methanol, ethanol, or polyols, such as ethylene glycol, propylene glycol, trimethylol propane or glycerol. Preferably, these polyether polyols are triols having an OH number of about 240–260, or diols having an OH number of about 250–270. A particularly preferred triol is a polypropylene oxide-based triol [HO($C_3H_6$O)CH[$CH_2$(O$C_3H_6$)$_n$OH]$_2$] having a weight average molecular weight of 675, available under the tradename MULTRANOL 9157 from Miles Inc., Pittsburgh, Pa., or LHT240 from Union Carbide. The amount of triol used in the compositions of the present invention is preferably about 5–50 parts by weight, more preferably about 1014 45 parts by weight, and most preferably about 15–20 parts by weight, per 100 parts by weight of the polyol component. A particularly preferred diol is a polypropylene oxide-based diol H(O$C_3H_6$)$_n$OH having a weight average molecular weight of 425, available under the tradename MULTRANOL 9121 from Miles Inc., Pittsburgh, Pa. The amount of diol used in the compositions of the present invention is preferably about 0–50 parts by weight, more preferably between 10–40 parts by weight, and most preferably about 15–20 parts by weight, per 100 parts by weight of the polyol component.

The polyol component can also include a saturated polyester polyol, such as a saturated polyesterether polyol. This can be used in place of, or in addition to, the polypropylene oxide-based diols and triols discussed above. Examples of suitable saturated polyester polyols are available under the DESMOPHEN tradename, such as DESMOPHEN 1150 from Mobay Corp., Pittsburgh, Pa. Typically, for compositions that include this material, the glass transition temperature changes resulting in a slightly more brittle product when subjected to impact at lower temperatures. Furthermore, such compositions have lower resistance to conditions of high temperature and humidity. For example, they tend to be more thermoplastic at elevated temperatures, e.g., temperatures in excess of 180° F.

Also included within the polyol component is a sucrose polyether polyol. This material helps control the overall reaction rate of the isocyanate component and the polyol component. Thus, by controlling the use of the sucrose polyether polyol, the open time of the gel can be adjusted as desired. Preferably, the sucrose polyether polyol component is a sucrose-propylene oxide polymer with an OH number of about 300–500 (more preferably about 350–400). It is available commercially as a blend of a sucrose-propylene oxide polymer, a monoethanolaminepropylene oxide copolymer or ($C_3H_6$O$C_2H_7$NO)$_n$, and a poly(propylene glycol) under the tradename MULTRANOL 6501 from Miles Inc., Pittsburgh, Pa. It is also available as a blend with propoxylated glycerine under the tradename DOW 361 from Dow Chemical Co. The sucrose polyether polyol can also contain amine groups, although such groups should be limited to less than about 2.8%. One suitable sucrose-amino polyol is available under the tradename THANOL R-420 from Arco Chemical, Newtown Square, Pa. The amount of the sucrose polyether polyol blend used in the compositions of the present invention is about 5 to 50 parts by weight and preferably between 10 to 40 parts by weight, and most preferably between 12 to 18 parts by weight per 100 parts by weights of the polyol component.

The polyol component can also include a relatively high molecular weight hydroxy-functional hydrophobic compound to enhance the hydrophobicity of the composition if desired. Preferably, the molecular weight of such compounds is at least about 800, and more preferably about 800–1500. Preferably, such compounds have an OH number of about 110–350, an equivalent weight of about 160–510, and a functionality of about 2–3.5. Suitable hydroxy-functional hydrophobic compounds include an extremely hydrophobic glyceryltriricinoleate triester hydroxy-functional compound such as castor oil, which has an OH number of 127 and a functionality of 2.3. Other high molecular weight hydroxy-functional compounds that can be used to achieve the desired level of hydrophobicity include such compounds as polyoxytetramethyleneoxide ether polyols, polyoxypropylene ether polyols, cyclohexanedimethylol, hexanediol, dipropylene glycol, tripropylene glycol, propylene glycol, ethylene glycol, diethylene glycol, triethylene glycol, 1,3-butanediol, butanediol, propargyl alcohol, and butyne diol. A particularly preferred material of this class of compounds is castor oil. Preferably, about 2–5 parts by weight of the castor oil is used relative to 100 parts by weight of the polyol component.

The polyol component can also contain a curative and a water-absorbing component, if desired, as well as additional additives. Typically, these additives are blended with the polyols in the polyol component, although they are not necessarily classified as "polyols." In certain situations they can be added to the isocyanate component, but this is a less desirable situation.

One or more curatives that are capable of promoting the reaction between an isocyanate group and a hydroxy group can also be included in the polyol component (or the isocyanate component if desired) of the present invention. Such curatives are often referred to as crosslinkers or chain-extenders. They can be used to control the open time and foaming of the compositions of the present invention depending on the application and environmental conditions. Curatives that react with isocyanates to produce hard segments and enhance the gelation, such as hydroxy-free diamine curatives, are preferred. Suitable hydroxy-free diamine curatives include aromatic and aliphatic diamines. Preferably, the hydroxy-free diamine curatives are aromatic diamines, such as the substituted toluenediamines diethyltoluenediamine and di(methylthio)toluenediamine. Particularly preferred curatives are available under the tradename ETHACURE 100 and ETHACURE 300 from Ethyl Corporation, Baton Rouge, La. ETHACURE 100, which is essentially diethyltoluenediamine (80% 2,4-DETDA, 19.4% 2,6-DETDA, and 0.8% 2,4,6-triethylbenzene-1,3-diamine), is preferred when a fast gel time, i.e., short open time, is desired, such as when there are high humidity conditions. ETHACURE 300, which is essentially di(methylthio)toluenediamine(80% 4-methyl-2,6-bis(methylthio)-1,3-benzenediamine and 20% 2-methyl-4,6-bis(methylthio)-1,3- benzenediamine), is preferred when a slow gel time, i.e., a long open time, is desired. Preferably, about 2–10 parts by weight, and more preferably about 5–7 parts by weight, per 100 parts by weight of the polyol component, of a curative (or mixture of curatives) is used.

Catalysts can also be used in this invention, however, they are not particularly desirable because they can cause the condensation reactions to occur too rapidly and not allow proper time for the fibers to wet-out and lay down. If desired, suitable catalysts that can be used are bismuth-containing catalysts such as COSCAT 84 available from Cosan Chemical Co., tertiary amines, such as triethylamine, dimethylethanolamine, triethylene diamine (DABCO), as well as organometallic catalysts such as stannous octate, dibutyltin dilaurate, dibutyltin mercaptide and the like. Other suitable catalysts are disclosed in U.S. Pat. No. 5,233,009 (Madan et al.). Preferably, the catalyst is a bismuth-containing catalyst.

One or more additives to absorb moisture can be included in the polyol component (or the isocyanate component). A particularly suitable such additive is molecular sieve, e.g., a synthetic zeolite, which is typically added to the polyol component as a mixture with castor oil (1:1 weight ratio). One such material is available under the tradename BAYLITH-L-PASTE from Bayer. Other suitable drying agents include natural zeolite having a particle size of not greater than about 5 microns and a pore size of about 2.5–4.5 Angstroms. Preferably, about 5–20 parts by weight of a drying agent are used, and more preferably about 7–10 parts by weight, per 100 parts by weight of the polyol component.

Other additives can be included in the polyol component (or the isocyanate component, although this is not preferred). For example, antifoaming agents typically used in polyurethane compositions, such as polysiloxane antifoaming agents, can be used to decrease the amount of foaming. Antifoaming agents can be used either individually or in admixture. Typically, no more than about 0.2–0.5 parts by weight of an antifoaming agent, based on 100 parts by weight of the polyol component.

Yet another additive that can be included in the polyol component (or the isocyanate component, although this is not preferred) is a nonreactive adhesive-enhancing material. In this context, "nonreactive" means that the material does not interfere in the reaction between the isocyanate component and the polyol component, or in the reaction with the curative. Suitable materials include, but are not limited to, a rosin ester, a halogenated biphenyl, a polybutadiene, a titanate, a zirconate, and a mixture thereof. Preferably, the adhesive-enhancing material is a rosin ester, a halogentated biphenyl, such as a chlorinated biphenyl, a polybutadiene.

Other additives that can be used in either the polyol component (or the isocyanate component, although this is not desired) include, for example, emulsifiers, surface-active stabilizers, pigments, dyes, UV-stabilizers, plasticizers, flame-retardents, fungicides, and bacteriocides.

A filler material can also be used in the polyurethane compositions of the present invention. Typically and preferably, a filler material is added as the isocyanate component and the polyol component are combined, although the filler material could be added to the polyol component prior to combining it with the isocyanate component. The filler material should be relatively dry. Preferably, it should have less than about 2% moisture content, and more preferably less than about 0.05% moisture content. For example, fillers such as silica, barytes, talc, mica, kaolin, diatomaceous earth, sand, calcium carbonate, titanium oxides, aluminum, aluminum oxides, iron oxides, carbon black, barium sulfate, cadmium sulfide, zinc sulfide, organic polymers such as polyester, glass, ceramics, carbon, etc., can be used for various purposes. Such fillers can be used to improve thermal conductivity, electrical conductivity, tensile strength, flexural modulus, color, etc. They can be used in the form of fibers, spheres, platelets, powders, pellets, etc. Preferred fillers are substantially inert under the conditions encountered when the components of the invention are mixed. Fillers can be used either individually or in admixture. Preferred embodiments include fibers, particularly glass fibers, of a size that can be wetted out and that can lay down. Typically, the fibers are about ⅛ inch to 1.5 inches long. Preferably, no more than about 40 parts (preferably about 20–30 parts) by weight filler is used, based on 100 parts of the polyol component.

For additional advantage, the isocyanate component can include a prepolymer prepared from an isocyanate and a nitrogen-free hydroxy-terminated polyether. This can increase the open time of the composition. Preferably, the hydroxy-terminated polyether has a molecular weight of about 1000–6000. It can be a diol, a triol, or combination thereof. Preferably, a diol is used to enhance the flexibility of the resultant product. The isocyanate used in this prepolymer can be any of the isocyanates discussed above.

Generally, in the composition of the present invention, the polyether polyol amine reacts with the isocyanate groups of the isocyanate component catalyzed by the tertiary amine groups. This reaction produces highly branched urethane-containing isocyanate-terminated hard segments that continue to react with the other polyols of the polyol component. The polyols chain extend and form more flexible segments between the hard segments that results in a increase in the flexural modulus of the polyurethane. Aromatic amines generally react rapidly with aromatic isocyanate, so a curative such as DETDA reacts with the isocyanates to extend the chains until the polyurethane is fully cured. The sucrose polyether polyol helps control the rate of condensation to allow the composition to flow and wet-out the fibers for a more homogenous distribution. As polymerization and chain extension of the polymer matrix continues the matrix becomes more intractable and hard due to formation of interpenetrating network of chains.

The composite products of the present invention can possess a wide range of characteristics, such as tensile strength, flexural strength, and hardness, depending on the compositions of the isocyanate component and the polyol component. For example, increasing the amount of the polyether polyol amine increases the rigidity and hardness as well as the thermal-resistance of the product. Varying the balance between the various nitrogen-free hydroxy-terminated polyethers, e.g., the diols and triols, affects the flexibility of the product. For example, a larger amount of a diol improves the elongation and decreases the hardness. Also, a larger amount of the sucrose polyether polyol decreases the hardness. Thus, in determining the amount of the sucrose polyether polyol it is necessary to balance the speed of the reaction with the desired hardness.

The system as it is manufactured will have an autocatalytic nature due to the capping or tipping of most of the polyols at the end of their molecular chains. Polyether polyols have been end capped with ethylene oxide and propylene oxide to give secondary functionalities and property controls. Propylene oxides are preferred because of their lower moisture sensitivity.

Mixing of the isocyanate component and the polyol component is preferably done very quickly to ensure a homogenous product. The preferred method of mixing is the plural component mixing, in which the isocyanate component is mixed with the polyol component to form a lamination resin. Curing is rapid, typically complete cure occurs in less than about 15 minutes. Once the two components are combined the polyurethane system has a potlife, i.e., workable life, of about 7 seconds to about 10 minutes. Thus, the composition of the present invention can be applied to a substrate using a variety of techniques, including rolling and dipping, for example. However, the composition is particularly wellsuited for spraying. The consideration of potlife when using plural component spray equipment is minimized by not allowing the two components to mix until they reach the spray gun. If the curing of the mixture is too slow, then the applied product tends to run and streak when applied to surfaces, if on the other hand the curing time of the mixture is too fast, then the spray gun will be blocked by crosslinked materials.

The compositions of the present invention can be used in a wide variety of products, particularly fiber-reinforced products such as structural component parts. Alternatively, the compositions of the present invention can be expanded by adding water to produce foam during the curing stage. In this application, fiber-reinforcement may or may not be used in the foamed material. Rather, a lightweight laminated material can be produced by sandwiching the expanded material between two layers of fiber-reinforced material.

The following examples further illustrate details of the preparation and use of the compositions of the present invention. The invention is not intended to be limited by these specific examples, however. All parts and percentages are by weight unless otherwise specified.

EXAMPLE 1

| Part A | |
|---|---|
| Mondur MR (Miles Inc.) | |
| 4,4'-MDI | 40–45% |
| Poly-MDI | 45–55% |
| 2,4-MDI | 1–10% |
| Mw = 380; Equivalent wt. = 133; | |
| Functionality = 2.7; % NCO = 31.5 | |
| Part B | |
| 1) MULTRANOL 9181 (Miles Inc.) | 42.2% |
| Ethylenediamine-propylene oxide aduct | |
| Mw = 292; OH No. = 750 | |
| 2) MULTRANOL 9157 (Miles Inc.) | 17.4% |
| Glycerol propoxylate | |
| Mw = 675; OH No. = 240 | |
| 3) MULTRANOL 9121 (Niles Inc.) | 16.4% |
| Poly(propylene glycol) | |
| Mw = 425; OH No. = 260 | |
| 4) MULTRANOL 6501 (Miles Inc.) | 13.9% |
| Polyether polyol blend | |
| Mw = 400; OH No. = 390 | |
| 5) BAYLITH-L-PASTE (Miles Inc.) | 7.8% |
| 50% Castor Oil/50% Molecular sieve | |
| 6) ETHACURE 100 | 2.3% |
| 2,4-DETDA 80%; 2,6-DETDA 19.4%; | |
| 2,4,6 Triethylbenzene, 1,3-diamine 0.8% | |
| NH No. = 630 | |

Equal volumes of A and B were sprayed using GUSMER model GX7 spray gun on an area of about 3 by 1 meter (prewaxed with mold release agent) and to a coating thickness of 1 min. The components were heated to a temperature between about 140° F. and about 160° F. during spraying. The reinforcement glass fiber roving (E-glass) was cut and dispensed into the spray pattern of the polyurethane spray, similar to polyester sprayup work.

Typically, the compositions of the present invention can be used to prepare and cure a fiber-reinforced component in a much shorter period of time that standard polyester systems. This is because the compositions of the present invention typically cure faster than polyester systems. Also, with a standard polyester system, prior to complete cure, the material must typically be rolled out to remove air and prevent bubbles in the cured product.

The material of Example 1 was tested for performance using the standard test method for fiber reinforced polymer composites. Flexural Strength (ASTM D790) was 4,190 psi (28.9 Mpa); Tensile Strength (ASTM D638) was 4,495 psi (31.0 Mpa); Impact Strength (ASTM D256) was 3.5 psi (187 J/m). These results show that the material produced by this invention exhibit superior performance than that of glass reinforced polyester.

EXAMPLE 2

A polyol blend was prepared according to the invention from 42 parts of an ethylenediamine-propylene oxide aduct with average molecular weight of about 292 and OH No. of 750 (MULTRANOL 9181 from Miles Inc.); 20 parts of a sucrose propylene glycol ether with average molecular weight of about 400 and OH No. of 390 (MULTRANOL 6501 from Miles Inc.); 15.5 parts of an glycerol propoxylate with average molecular weight of about 675 and OH No. of 240 (MULTRANOL 9157 from Miles Inc.); 15 pans of an poly(propylene glycol) with average molecular weight of about 425 and OH No. of 260 (MULTRANOL 9121 from Miles Inc.); 5 pans by weight of 50% caster oil and 50% molecular sieves (BAYLITH-L-PASTE from Miles Inc.); and 2.5 pans by weight of ETHACURE 100 (Ethyl Corp.). These amounts are based on 100 pans of the total composition. This polyol blend was mixed and sprayed with pan A of Example 1 and fiberglass as described in Example 1 in amounts to produce an isocyanate index of 118.9. A hard semi-rigid material was formed.

EXAMPLE 3

A polyol blend was prepared according to the invention from 36 parts of an ethylenediamine-propylene oxide aduct with average molecular weight of about 292 and OH No. of 750 (MULTRANOL 9181 from Miles Inc.); 22 parts of a sucrose propylene glycol ether with average molecular weight of about 400 and OH No. of 390 (MULTRANOL 6501 from Miles Inc.); 17.5 pans of an glycerol propoxylate with average molecular weight of about 675 and OH No. of 240 (MULTRANOL 9157 from Miles Inc.); 17 pans of an poly(propylene glycol) with average molecular weight of about 425 and OH No. of 260 (MULTRANOL 9121 from Miles Inc.); 5 pans by weight of 50% caster oil and 50% molecular sieves (BAYLITH-L-PASTE from Miles Inc.); and 2.5 pans by weight of ETHACURE 100 (Ethyl Corp.). These amounts are based on 100 parts of the total composition. This polyol blend was mixed and sprayed with pan A of Example 1 and fiberglass as described in Example 1 in amounts to produce an isocyanate index of 112.8. A softer material than that formed in Example 2 was produced from this composition.

EXAMPLE 4

A polyol blend was prepared according to the invention from 30 parts of an ethylenediamine-propylene oxide aduct with average molecular weight of about 292 and OH No. of 750 (MULTRANOL 9181 from Miles Inc.); 24 parts of a sucrose propylene glycol ether with average molecular weight of about 400 and OH No. of 390 (MULTRANOL 6501 from Miles Inc.); 19.5 pans of an glycerol propoxylate with average molecular weight of about 675 and OH No. of 240 (MULTRANOL 9157 from Miles Inc.); 19 parts of an poly(propylene glycol) with average molecular weight of about 425 and OH No. of 260 (MULTRANOL 9121 from Miles Inc.); 5 parts by weight of 50% caster oil and 50% molecular sieves (BAYLITH-L-PASTE from Miles Inc.); and 2.5 pans by weight of ETHACURE 100 (Ethyl Corp.). These amounts are based on 100 parts of the total composition. This polyol blend was mixed and sprayed with part A of Example 1 and fiberglass as described in Example 1 in amounts to produce an isocyanate index of 105.7. A softer material than that formed in Example 3 was produced from this composition.

EXAMPLE 5

A polyol blend was prepared according to the invention from 32 pans of an ethylenediamine-propylene oxide aduct with average molecular weight of about 292 and OH No. of 750 (MULTRANOL 9181 from Miles Inc.); 14 parts of a sucrose propylene glycol ether with average molecular weight of about 400 and OH No. of 390 (MULTRANOL 6501 from Miles Inc.); 21 parts of an glycerol propoxylate with average molecular weight of about 675 and OH No. of 240 (MULTRANOL 9157 from Miles Inc.); 24 parts of an poly(propylene glycol) with average molecular weight of about 425 and OH No. of 260 (MULTRANOL 9121 from Miles Inc.); 7 parts by weight of 50% caster oil and 50% molecular sieves (BAYLITH-L-PASTE from Miles Inc.); and 2 parts by weight of ETHACURE 100 (Ethyl Corp.). These amounts are based on 100 parts of the total composition.

This polyol blend was mixed and sprayed with a blend of the isocyanate used in Example 1 and a pre-reacted isocyanate having an equivalent weight of 332 and a 12.6% NCO content [prepared by reacting a 50:50 mixture of ISONATE 143L isocyanate (144 equivalent weight and 29.5% NCO content) with a 2000 molecular weight propylene oxide capped diol], in amounts to produce an isocyanate index of 117. This material generally had a lower tensile, higher elongation, and a lower flexural modulus than the material produced in Example 1.

The complete disclosures of all patents, patent documents, and publications cited herein are incorporated by reference, as if individually incorporated by reference. Although this invention has been described in detail in the foregoing Detailed Description and Examples, it is to be understood that such detail is solely for the purpose of illustration. Variations and modifications can be made by one of skill in the art without departing from the spirit and scope of the invention.

What is claimed is:
1. A sprayable polyurethane composition comprising:
(a) a sprayable isocyanate component;
(b) a sprayable polyol component comprising;
  (i) a tertiary amine-containing hydroxyl functional polyether polyol;
  (ii) a sucrose-polyether polyol; and
  (iii) a nitrogen-free hydroxy-terminated polyether polyol other than said sucrose-polyether polyol; and
(c) a nonreactive adhesive-enhancing component.

2. The polyurethane of claim 1 wherein the nonreactive adhesive-enhancing component is selected from the group consisting of a rosin ester, a halogenated biphenyl, a polybutadiene, and a mixture thereof.

3. The polyurethane of claim 2 further including a filler material.

4. A sprayable polyurethane composition comprising:
(a) a sprayable isocyanate component comprising an aromatic isocyanate having an NCO content of about 30–32 wt-%; and
(b) a sprayable polyol component comprising:
  (i) a tertiary amine-containing hydroxyl functional polyether polyol;
  (ii) a polyether diol having an OH number of about 250–270;
  (iii) a polyether triol having an OH number of about 240–260;
  (iv) a sucrose-polyether polyol; and
  (v) a hydroxy-free diamine curative;
wherein the isocyanate component and the polyol component are combined in amounts such that the isocyanate index is about 105–150.

5. The polyurethane of claim 4 further including a fibrous-reinforcing material.

6. A sprayable polyurethane composition comprising:
(a) a sprayable isocyanate component comprising a prepolymer from:
  (i) a polyisocyanate; and
  (ii) a nitrogen-free hydroxy-terminated polyether diol having a molecular weight of about 1000–6000; and
(b) a sprayable polyol component comprising:
  (i) a tertiary amine-containing hydroxyl functional polyether polyol;
  (ii) a sucrose-polyether polyol; and
  (iii) a nitrogen-free hydroxy-terminated polyether polyol, other than said
sucrose-polyether polyol.

7. A method for preparing a molded fiber-reinforced polyurethane comprising combining the following components while spraying them into a mold:
(a) a sprayable isocyanate component;
(b) a sprayable polyol component comprising:
  (i) a tertiary amine-containing hydroxyl functional polyether polyol;
  (ii) a sucrose-polyether polyol; and
  (iii) a nitrogen-free hydroxy-terminated polyether polyol other than said sucrose-polyether polyol;
(c) a nonreactive adhesive-enhancing component; and
(d) a fibrous-reinforcing material.

* * * * *

UNITED STATES PATENT AND TRADEMARK OFFICE
CERTIFICATE OF CORRECTION

PATENT NO. : 5,614,575
DATED : March 25, 1997
INVENTOR(S) : Rex R. Kotschwar

It is certified that error appears in the above-indentified patent and that said Letters Patent is hereby corrected as shown below:

Col. 1, line 22, delete "tamable" and insert --flamable--;
Col. 5, line 8, delete "inolecular" and insert --molecular--;
Col. 5, line 30, delete "1014 45" and insert --10 - 45--;
Col. 9, line 50, delete "(Niles" and insert --(Miles--;
Col. 10, line 30, delete "pans" and insert --parts--;
Col. 10, line 33, delete "pans" and insert --parts--;
Col. 10, line 35, delete "pans" and insert --parts--;
Col. 10, line 36, delete "pans" and insert --parts--;
Col. 10, line 37, delete "pan " and insert --parts--;
Col. 10, line 49, delete "pans" and insert --parts--;
Col. 10, line 51, delete "pans" and insert --parts--;
Col. 10, line 54, delete "pans" and insert --parts--;
Col. 10, line 58, delete "pan " and insert --parts--;
Col. 11, line 4, delete "pans" and insert --parts--;
Col. 11, line 11, delete "pans" and insert --parts--; and
Col. 11, line 21, delete "pans" and insert --parts--.

Signed and Sealed this

Eighteenth Day of August, 1998

Attest:

BRUCE LEHMAN

Attesting Officer

Commissioner of Patents and Trademarks